E. A. WHITE.
Brake-Mechanism.
No. 214,539. Patented April 22, 1879.
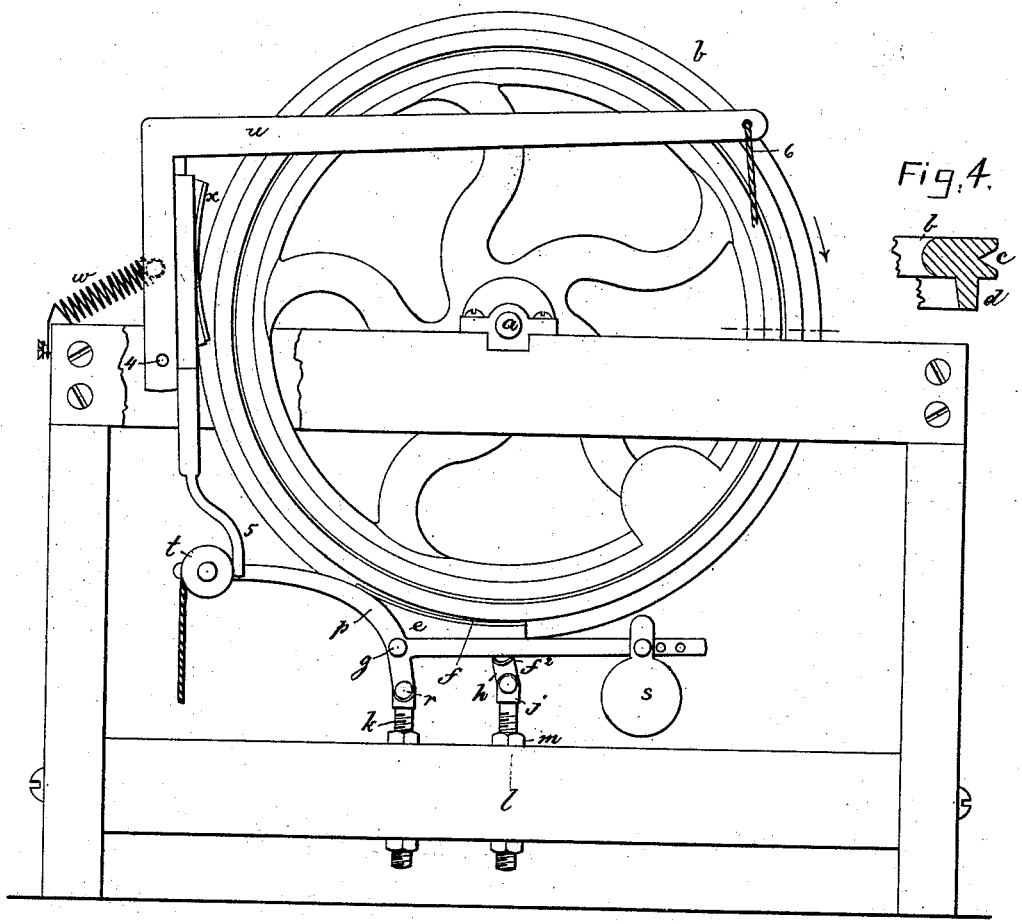
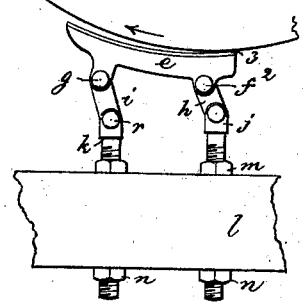
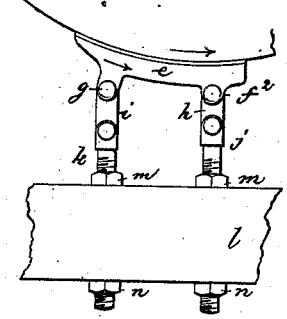
Witnesses.
Lawrence F. Connor.
N. E. Whitney.
Inventor.
Edwin A. White,
by Crosby Gregory Attys

UNITED STATES PATENT OFFICE.

EDWIN A. WHITE, OF BOSTON, MASSACHUSETTS.

IMPROVEMENT IN BRAKE MECHANISMS.

Specification forming part of Letters Patent No. 214,539, dated April 22, 1879; application filed March 7, 1879.

*To all whom it may concern:*

Be it known that I, EDWIN A. WHITE, of Boston, county of Suffolk, State of Massachusetts, have invented an Improvement in Brake Mechanism, of which the following description, in connection with the accompanying drawings, is a specification.

This invention relates to brake mechanism for elevator-wheels, chiefly those operated by hand by means of a rope about the power-wheel.

The object of my invention is the production of a cheap, simple, and absolutely positive brake.

In this my invention the main brake-shoe is so pivoted at or near each end as to be moved tangentially toward and from the periphery of the power or other wheel on the shaft to be checked, and combined with it is a two-armed weighted lever, by which to remove the shoe from contact with the wheel, and to keep it at the proper distance from the said wheel.

In connection with the said brake-shoe and its lever I employ an auxiliary lever, which, by a partial movement in one direction, may be made to release the main brake from the wheel, to permit it to turn, so as to lower a load or platform, and yet further movement of the auxiliary lever in the same direction causes it to act as a supplemental brake. This auxiliary lever will act as a brake should the main brake fail to operate, and so double security is provided for.

Figure 1 represents, in side elevation, an elevator or other power wheel with my invention applied thereto; Fig. 2, a detail of the main brake-shoe in the position it will occupy when the elevator is hoisting; and Fig. 3, a detail showing the said shoe in the position it will occupy when the wheel of the elevator is checked to prevent the body raised by the elevator from being lowered, and Fig. 4 represents a detail of the periphery of the brake or master wheel $b$.

The shaft $a$, supported in usual bearings, is supposed to actuate the drum, upon which is wound the rope employed to lift the load.

This shaft $a$ carries the power-wheel $b$, the surface of which is grooved, (see Fig. 4,) as at $c$, for the reception of the hoisting-rope, which is pulled by hand to turn the wheel $b$ in the direction of the arrow near it in Fig. 1, to raise a load, and with a flat surface, $d$, against which the brakes operate.

The main brake-shoe $e$, faced preferably with leather or other proper material, $f$, is pivoted at two points, $f^2$ $g$, upon links $h$ $i$, pivoted upon adjusting-rods $j$ $k$, held on a cross-beam, $l$, by means of nuts $m$ $n$, so that the ends of the shoe may be placed at the proper level with relation to the periphery of the wheel $b$, and so as to allow the proper amount of space between the shoe and wheel when the wheel is being turned to raise a load, as in Figs. 1 and 2.

The lever $p$, which directly operates the shoe $e$, has its pivot upon the pin $r$, which connects the link $i$ with the adjusting-rod $k$, and the lever is also connected above its pivot $r$ with the pivot $g$, which joins link $i$ and one end of the shoe $e$. This lever at one end has an adjustable weight, $s$, and at its other end a stud or roller, $t$.

When a load is being lifted the wheel $b$ is turned in the direction of the arrows, Figs. 1 and 2, and the brake-shoe is forced away from the periphery of the wheel by the action of the wheel upon the end 3 of the brake, the weight $s$ being just sufficient to keep the end of the said shoe against the wheel, as in Fig. 2.

If the direction of motion of wheel $b$ is reversed, the periphery of the wheel acting upon the shoe will carry the latter with it in the direction of the arrows, Fig. 3, which will straighten the links $h$ $i$ and force the brake-shoe against the wheel and stop or check its motion.

If it is desired to release the wheel and permit it to be reversed and unwind the hoisting-rope, then the left-hand end of lever $p$ will be depressed, which will carry the shoe $e$ away from the wheel $b$, permitting it to turn in the direction of the arrow in Fig. 3 until the lever $p$ is again released. This lever may be operated by means of a cord, (shown in dotted lines, Fig. 1,) it being extended down parallel to the usual endless pulley-operating rope, (not shown,) which will be placed about wheel $b$. I, however, prefer to release this shoe from wheel $b$ by means of the auxiliary lever $u$, pivoted at 4, and having its lower end, 5, extended downward, so as to rest very near roller or stud $t$ of lever $p$. This lever $u$ is held in the position shown in Fig. 1 by means of a spring, $w$, and the lever will be moved in opposition to the said spring, and so as to release lever $p$ and brake $l$ by means of a hand-rope, 6, a piece of which is shown in Fig. 1, the said rope in practice being extended downward parallel with or near the usual large hand-rope, which is employed to turn wheel $b$. A slight movement of this auxiliary lever by its hand-rope 6 will depress the left-hand end of lever $p$, or draw shoe $e$ away from the wheel and release it; but if the movement of the auxiliary lever $u$ is continued in the same direction its brake-face $x$ will be forced against the part $d$ of the wheel $b$, and said auxiliary lever and its attached brake $x$ will thus act to stop the rotation of wheel $b$, as may be desired. This construction furnishes a double brake for the wheel $b$.

Pivoting the main brake $e$ at two points, and giving it a tangential movement, as shown and described, by links, enables it to be operated easily and quickly to release or to automatically grasp and check the movement of the wheel $b$.

I claim—

1. The wheel $b$, combined with the shoe $e$, and with the two pivoted parallel links $i\ h$, connected with the said shoe near its opposite ends, to operate as and for the purpose set forth.

2. The wheel $b$ and shoe and its pivoted supporting-links, combined with the adjusting-rods, to place the ends of the shoe at the proper level, substantially as described.

3. The wheel $b$, double-pivoted brake-shoe, made movable with relation to the periphery of the wheel, as described, combined with a lever, $p$, connected therewith, to operate substantially as and for the purpose set forth.

4. The wheel $b$, double-pivoted brake-shoe, made movable with relation to the periphery of the wheel, as described, and the main-brake lever connected with the said brake-shoe, combined with an auxiliary lever to operate the main brake-lever and shoe, substantially as and for the purpose set forth.

5. The main brake-shoe and main brake-lever, connected together as described, combined with wheel $b$ and with the auxiliary lever and its brake, to thereby provide two brakes for the wheel, the auxiliary brake being available in case the main brake should fail, substantially as described.

In testimony whereof I have signed my name to this specification in the presence of two subscribing witnesses.

EDWIN A. WHITE.

Witnesses:
G. W. GREGORY,
L. F. CONNOR.